United States Patent [19]

Kuragano et al.

[11] Patent Number: 4,819,192
[45] Date of Patent: Apr. 4, 1989

[54] METHOD OF DISPLAYING IMAGE

[75] Inventors: Tetsuzo Kuragano; Atsushi Kikuchi, both of Kanagawa, Japan

[73] Assignee: Sony Corporation, Tokyo, Japan

[21] Appl. No.: 832,990

[22] Filed: Feb. 24, 1986

[30] Foreign Application Priority Data

Feb. 26, 1985 [JP] Japan .................. 60-37077
Feb. 26, 1985 [JP] Japan .................. 60-37079
Feb. 26, 1985 [JP] Japan .................. 60-37078

[51] Int. Cl.$^4$ .............................. G09B 9/08
[52] U.S. Cl. .................... 364/522; 340/728; 364/521
[58] Field of Search ............. 364/518, 521, 522; 340/700, 703, 724, 728, 750, 793, 798, 799

[56] References Cited

U.S. PATENT DOCUMENTS 4,609,993  9/1986 Shimtzu ............... 364/521 X
4,623,977 11/1986 Schrieber ............. 340/728 X Primary Examiner—Gary V. Harkcom
Assistant Examiner—H. R. Herndon
Attorney, Agent, or Firm—Philip M. Shaw, Jr.

[57] ABSTRACT

A method of displaying graphic image surface information data of an object lying within a three-dimensional space on a two-dimensional display screen when seen from a predetermined observing point is disclosed. A patch of the surface of an object is separated into plural triangular units, and image information data (luminance, visible-nonvisible, and distance) are all represented at the three apexes of each triangular unit area which includes a number of display pixels. The positional data at the three apexes are transformed from three- to two-dimensional space. The other image information data are calculated in accordance with interpolation calculation. Prior to the interpolation calculation a display area is determined and a triangular area including pixels to be processed is determined to reduce the processing time. This process is repeated for the entire surface to be displayed.

9 Claims, 6 Drawing Sheets

PRINCIPLE OF SHADOW PROCESSING

PRINCIPLE OF HIDDEN SURFACE PROCESSING

PRINCIPLE OF VISIBLE – NONVISIBLE POSITION DETERMINATION PROCESSING

PROCEDURE OF IMAGE TRANSFORM PROCESSING

FIG. 5
TABLE OF VARIOUS DATA
| 10 | TABLE 1 | TABLE 2 | TABLE 3 | TABLE 4 |
|---|---|---|---|---|
| XY TABLE | | LUMI-NANCE | DIS-TANCE | VISIBLE-NON VISIBLE |
| X | Y | | | |
1ST PATCH — 25 WORDS, 5 IN U DIR., 5 IN V DIR.
2ND PATCH — 25 WORDS
FIG. 6
CUTTING INTO UNIT AREAS
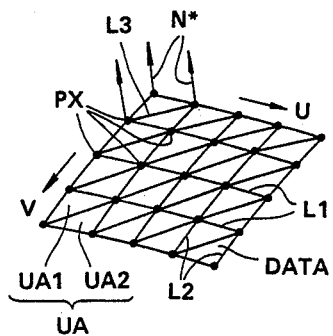
FIG. 7
FORMATION OF VISIBLE – NONVISIBLE DATA
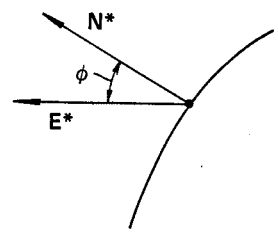

FORMATION OF DISTANCE DATA

FORMATION OF LUMINANCE DATA

PROCEDURE OF PERSPECTIVE TRANSFORMATION

FIG. 11
PROCEDURE OF DISPLAY AREA DETERMINATION
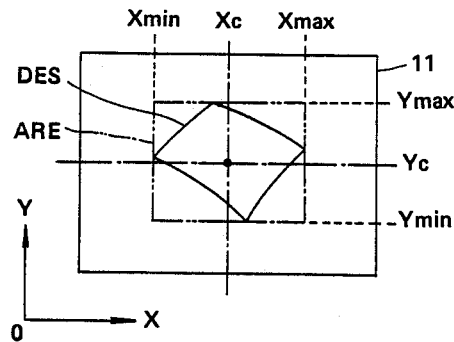
FIG. 12
PROCEDURE OF APEX DATA READING
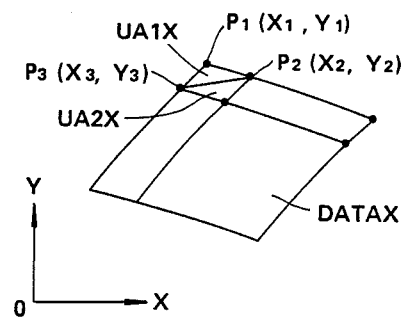
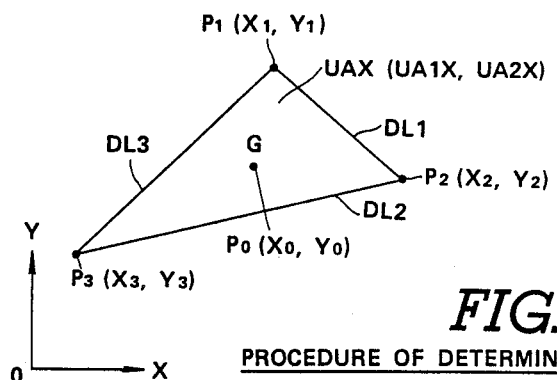
FIG. 13
PROCEDURE OF DETERMINING TRIANGLE AREA OF CURRENT PIXEL

PROCEDURE OF VISIBLE - NONVISIBLE DATA INTERPOLATION

PROCEDURE OF LUMINANCE DATA INTERPOLATION

PROCEDURE OF DISTANCE DATA INTERPOLATION

METHOD OF DISPLAYING IMAGE

BACKGROUND OF THE INVENTION

1. Field of the Invention

The present invention relates generally to a method of displaying an image and more specifically to a computerized method of displaying on a two-dimensional, raster scan display screen an image lying within a three-dimensional space.

2. Description of the Prior Art

In prior computer graphic display methods, graphic image data of an object or objects lying within a three-dimensional space are previously stored in memory as three-dimensional coordinates information; the information data are read from the memory in sequence; and the read data are image-transformed in accordance with predetermined calculation formulas in order to present a solid graphic image on a display screen. When the above image transformation calculations are executed to display an image on the two-dimensional display screen, three methods have usually been adopted to convey an impression of the three dimensional features of the object, namely perspective transformation processing, shawdow processing and hidden surface processing.

By the perspective transformation processing, the feeling of distance can be displayed by changing the size of an object in proportion to the distance to an observing point on the basis of the fact that the near is perceived as large and the far is perceived as small whenever an object is seen through human eyes.

By the shawdow processing, the ups-and-downs of surfaces of an object are displayed by changing the apparent brightness of the illumination on each surface of a graphic image represented on a display screen on the basis of the fact that the inclinations of the outer surfaces of an object are different from each other relative to a light source positioned at a point within a three-dimensional space so that the human eye sees the object as if the brightness on each surface of an object changes.

By the hidden surface processing, the feeling of distance can be represented by not displaying the graphic image of nonvisible portions. This derives from the fact that when objects are seen from an observing point within a three-dimensional space, one cannot see the rear surfaces of an object or the surfaces of backward positioned objects upon which frontward positioned objects are superposed.

These three processings are the methods under consideration by which objects can be solidly displayed if an empirical law obtained when one sees objects positioned within a three-dimensional space is realized in accordance with physical calculations. For the purpose of realizing the empirical law, some algorithms have been proposed.

These processings are effective to a certain extent even if adopted independently. However, if combined, since it is possible to obtain a further natural feeling of solidness, the following two methods have conventionally been adopted as a method of executing these processings by means of a computer:

In the first conventional method, the spatial positional relationship between an observing point, a light source and an object are previously determined; the results obtained by perspective processing, shadow processing and hidden surface processing are written in memory as a series of data; and the data are read from the memory, where necessary, in order to display a graphic image.

In this first method, although it takes a great deal of time in forming a series of data to be written in the memory, there exists an advantage in that it does not take much time to transform the image information. However, there still exist problems in that it is necessary to previously determine the spatial positional information of the observing point, and it is necessary to form a series of data for each observing point when the number of observing points increases or when the observing point moves. Therefore, there exist the drawbacks that it is impossible to finely change the position of an observing point or it is necessary to provide a great scale of memory capacity large enough to store plural series of data. That is, this method can only be adopted in practical use in displaying an object having a relatively simple external shape.

In the second conventional method, the spatial positional relationship between a light source and an object is set so as to be initialized; the perspective transformation processing, the shadow processing and the hidden surface processing are executed by subroutine. When spatial positional information of an observing point is given, the above three processings for solid representation can be executed in sequence, respectively.

In this second method, although the spatial position of an observing point can be freely determined, since the perspective transformation processing, the shadow processing and the hidden surface processing should be executed for each pixel the amount of data processing becomes huge beyond practical use. For instance, in the case when the system is configured by pixels of $1,000 \times 1,000$ pieces, 1,000,000 times calculations should be repeated in the perspective transformation processing, the shawdow processing and the hidden surface processing for one observing point. Therefore, there exists a problem in that it takes as much as several hours, for instance, for the processing calculation.

SUMMARY OF THE INVENTION

With these problems in mind, therefore, it is the primary object of the present invention to provide a method of displaying image data representative of surfaces of an object lying within a three-dimensional space onto a two-dimensional display screen in accordance with a perspective transformation method when seen from a predetermined observing point, by which it is possible to markedly reduce the calculation time required for the shawdow processing and the hidden surface processing, in particular, as compared with conventional methods.

To achieve the above-mentioned object, the method according to the present invention comprises the following computational steps of: (a) dividing a surface of the object into a plurality of triangular unit areas to obtain first sets of plural data representative of object surface image information at the three apexes of each triangular unit area; (b) perspectively transforming only the positional data representative of the positions of the three apexes of each triangular unit area, which data is included in the first plural data, onto a two-dimensional plane corresponding to the display screen, in relation to the predetermined observing point to obtain second positional data representative of the positions of second sets of three apexes, corresponding to the three apexes of each triangular unit area as transformed onto the two-dimensional plane; (c) vertically setting other object surface image information data included in the first data separately at the second three apexes of each triangular unit area on the two-dimensional plane to separately form plural triangular image data planes at three tops of the vertically set object surface image information data; (d) obtaining each point of intersection between each formed triangular image data plane and each straight line vertically set at each point representing a pixel of the display screen included within each triangular area surrounded by the second three apexes on the two-dimensional plane in accordance with interpolation calculation to separately obtain subject surface image information data; and displaying said separate, object surface image information data at each corresponding pixel on the display screen.

Further, in a preferred embodiment of the invention the method according to the present invention comprises the steps of determining a display area on the display screen within which an object image is to be displayed on the two-dimensional plane by selecting the maximum and minimum values of the second positional data representative of positions of the second three apexes on the two-dimensional plane, calculating a center of the displayed object image, and executing the display processing of the object surface information data only for points representing pixels which are included within the determined display area.

More specifically, this method of excluding calculations for pixels outside of the display area comprises the following steps of: (a) calculating each center of gravity of each triangular unit area on the two-dimensional plane and (b) determining a triangular unit area within which the current processed point representing a display pixel lies on the basis of each calculated center of gravity and the three sides of the triangular unit area before computationally, vertically setting the object surface image information data, included in the first data, at the second three apexes of the triangular unit area on the two-dimensional plane.

In the method according to the present invention, the object surface image information are luminance data, visible-nonvisible data, and distance data at the three apexes of each triangular unit area for providing shawdow surfaces and hidden surfaces on the displayed object image.

The method according to the present invention has the following features and advantages:

(1) By separating a surface of an object into a plurality of triangular unit areas, each including a number of processed points (pixel points), and only perspectively transforming the three apex positional data from a three-dimensional space to a two-dimensional plane, with the pixel points represented by only three apex points, the time required in perspective transformation processing is markedly reduced.

(2) It is possible to definitely and simply obtain the object surface image information data (luminance, visible-nonvisible and distance data) at each pixel. In accordance with a simple linear interpolation method, the three image information data are computationally, vertically set as the three apexes of each triangular unit area on the two-dimensional plane to form a separate data plane for each triangular unit area; a plurality of straight lines are computed to vertically pass through each pixel point included within each triangular unit area and each point of intersection between the plane and the straight line is calculated, thus reducing the time required for the calculation for the object surface image information at each pixel.

(3) Since a display area within which an object image is to be displayed is determined before the above-mentioned interpolation calculation, it is possible to execute the necessary data calculation processing only at pixels included within the display area without processing at pixels lying outside the display area, thus reducing the time required for the interpolation calculation.

(4) Since each center of gravity of each triangular unit area is determined on the two-dimensional plane and a triangular unit area within which the current pixel lies is determined on the basis of the calculated center of gravity and the three sides of the triangular unit area before the above-mentioned interpolation calculation, it is possible to readily select only the triangular area necessary for interpolation calculation at each pixel included within the determined display area and to exclude all other pixels and triangular unit areas, thus reducing the time required for the interpolation calculation.

(5) Since only the luminance data having the smallest distance data is displayed when plural visible data exist at the same pixel point, it is possible to securely display the image on the basis of hidden surface processing.

In summary, in the automatic data processing method according to the present invention, (1) a surface of an object corresponding to one patch is separated into plural triangular unit areas; (2) image information data (luminance, visible-nonvisible, and distance data) are formed at each apex; (3) only the three apex positional data are perspectively transformed to the two-dimensional plane; (4) a display area is previously determined; (5) a triangular unit area including pixels to be processed is determined; and (6) image information data are calculated only at each pixel included within the display area in accordance with interpolation, whereby it is possible to markedly reduce the processing time required by the data processing computer.

BRIEF DESCRIPTION OF THE DRAWINGS

The features and advantages of the method of displaying an image according to the present invention will be more clearly appreciated from the following description of the preferred embodiment of the invention taken in conjunction with the accompanying drawings in which like reference numerals or symbols designate the same or similar elements or sections throughout the figures thereof and in which:

FIG. 5 is a table for storing various data in displaying an image in accordance with the method of the present invention;

FIG. 6 is a diagram for assistance in explaining the separation of one-patch data DATA into plural triangular unit areas UA1, UA2;

FIG. 7 is a diagram for assistance in explaining the method of forming visible-nonvisible data;

FIG. 11 is a diagram for assistance in explaining the procedure of determining a display area;

FIG. 12 is a diagram for assistance in explaining the procedure of extracting apex data DATAX, P(X, Y) at triangular apexes PX lying within the display area ARE from the X-Y table for execution of interpolation calculating processing;

FIG. 13 is a diagram for assistance in explaining the determination of the triangular unit area within which a processed point (pixel) lies in dependence upon the gravity center;

DETAILED DESCRIPTION OF THE PREFERRED EMBODIMENTS

With reference to the drawings, the present invention will be described hereinbelow in detail for the case where image data of an object having a curved surface are transform-processed.

In the method of transforming a graphic image described later, the shadow processing and the hidden surface processing necessary for displaying a solid graphic image on a two-dimensional raster screen are executed in accordance with the method as described below.

Shadow Processing

Figure 1:
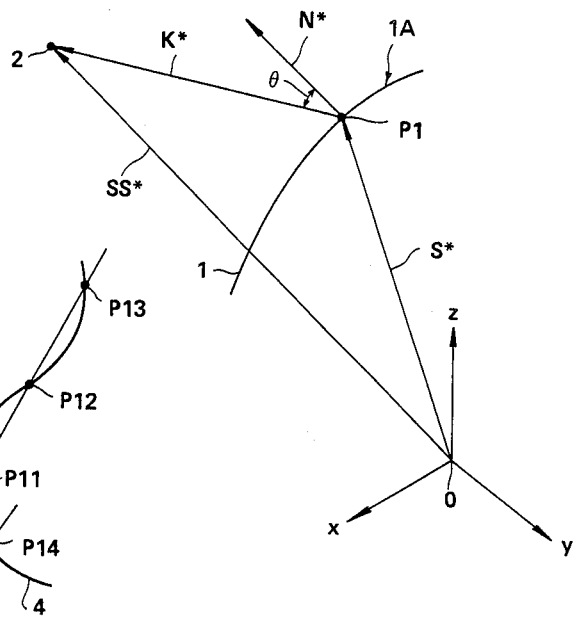
FIG. 1 is a diagram for assistance in explaining the principle of processing of a shawdow formation of an object.

The shadow processing is to allow the depiction of shadows on the surfaces of a graphic image displayed on a display screen. As shown in FIG. 1, when light is allowed to be incident from a light source 2 upon a curved surface 1A of an object 1 disposed within a three-dimensional space represented by absolute coordinates x, y, z, the luminance (i.e., brightness) at position P1 within a minute area on the curved surface 1A changes according to the angle $\theta$ subtended by the normal of the curved surface 1A at the position P1 and the direction on light source 2. The shadow processing is expressed by $$I = (1-D) \cdot A + D \quad (1)$$

where I is the luminance at the position P1 by which a shadow produced by the light source 2 on the surface of the object 1 can be represented; D is a constant; and A is a variable expressed as $$A = \frac{K^* \cdot N^*}{|K^*| \cdot |N^*|} = \cos\theta \quad (2)$$

Thus, variable A can be expressed by a formula such that the inner product of light source vector $K^*$ and normal unit vector $N^*$ at position P1 is divided by the product of the absolute values of the light source vector $K^*$ and the normal unit vector $N^*$. This formula indicates the cosine of an angle $\theta$ subtended by the light source vector $K^*$ and the normal unit vector $N^*$.

In FIG. 1, the position of the light source 2 is expressed by a position vector $SS^*$ on absolute coordinates x, y, z, and the position P1 of the curved surface 1A is expressed by a curved surface position vector $S^*$. The gradient of the curved surface 1A at this position P1 is expressed by the normal unit vector $N^*$ on the curved surface 1A. Further, the direction of light incident from the light source 2 upon the position P1 is expressed by a vector $K^*$ drawn from the position P1 to the light source 2. The incident angle of the light is expressed by an angle $\theta$ subtended by the normal unit vector $N^*$ and the light source vector $K^*$.

As described above, the luminance I at the position P1 on the curved surface 1A is determined by the variable A. Therefore, if the incident angle $\theta$ of the light allowed to be incident from the light source 2 upon the position P1 varies, the variable A varies within the range between $-1$ and $+1$ according to the change in the angle $\theta$. If the incident angle $\theta$ is 0° (i.e. the light source is in the direction of the normal unit vector $N^*$ at the position P1 on the curved surface 1A) the luminance at the position P1 is the brightest. If the incident angle $\theta$ changes between $+90°$, the luminance at the position P1 decreases (i.e. the luminance I goes down to zero).

Hidden Surface Processing

Figure 2:
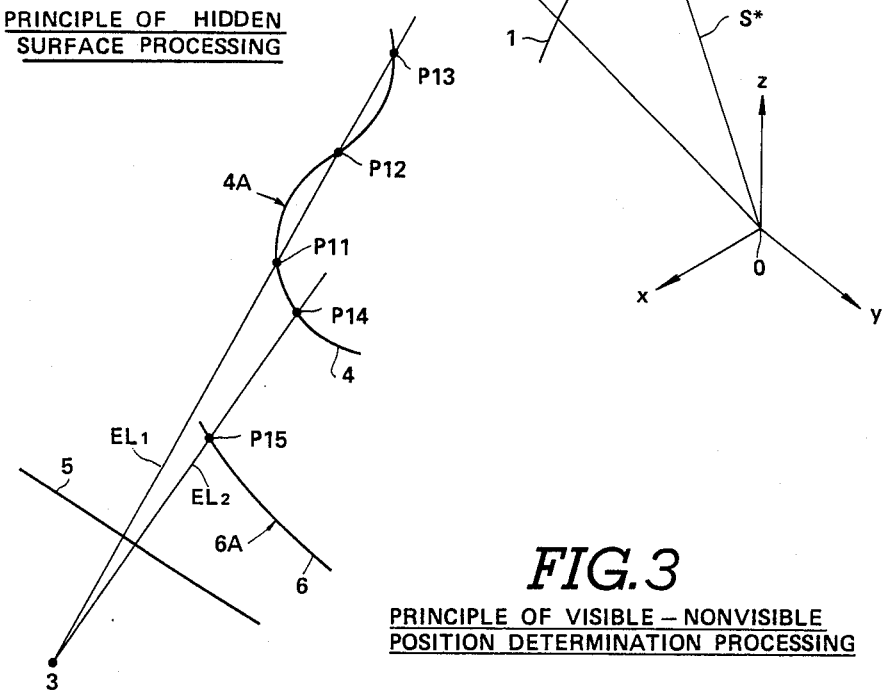
FIG. 2 is a diagram for assistance in explaining the principle of processing a hidden surface formation on a first object due to a second object.

In hidden surface processing graphic image data is processed in such a way that object surfaces not seen from an observing point are not displayed on a display screen. In this processing, as shown in FIG. 2, only the visible portions of an object represented by curved surface 4A are displayed on the basis of the fact that there are portions to be seen (referred to as visible portions) and portions not to be seen (referred to as non-visible portions) when a curved surface 4A of an object 4 is seen from an observing point 3.

The determination as to whether each portion on the curved surface 4A is visible or not is made on the basis of the following two conditions: In the first condition, as depicted in FIG. 2, when the curved surface 4A of object 4 is seen from the observing point 3 along the line of sight EL1, there are points of intersections P11, P12 and P13 of the sight line EL1 and the curved surface 4A. It is to be understood that these points are only representative of all points on the surface. The surface portion between the positions P12 and P13 is hidden because there exists a surface which intersects the sight line EL1 at the position P11 on the side of the observing point 3. Therefore, the surface portion between positions P12 and P13 is determined to be non-visible, and graphic image data transformation processing is executed in such a way that the visible surface portion at the position P11 is seen on a phantom screen 5 disposed between the object 4 and the observing point 3. This "phantom screen" is a computational artifice representing the position of the two-dimensional display screen relative to the three-dimensional object.

The second condition is that the surface portions to be displayed are not hidden by other objects, i.e., surfaces other than surface 4A. In FIG. 2, since another object 6 lies between the observing point 3 and the curved surface 4A of the object 4, when the object 4 is seen along the sight line EL2, the sight line EL2 intersects the curved surface 6A of the object 6 before intersecting the curved surface 4A of the object 4. That is, the surface portion at the position P14 on the object curved surface 4A is hidden by the surface portion at the position P15 on the object curved surface 6A. Therefore, graphic image data transformation processing is executed in such a way that the non-visible surface portion at the position P14 is not displayed but the visible surface portion at the position P15 is displayed on a phantom screen 5.

Figure 3:
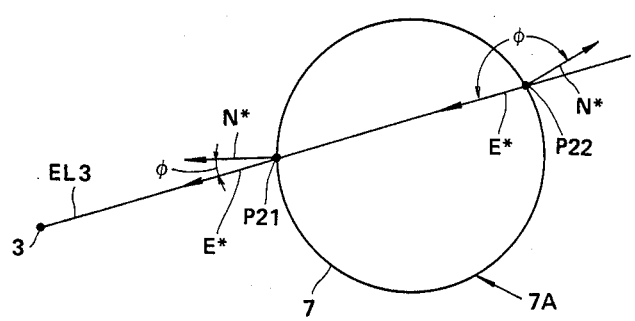
FIG. 3 is a diagram for assistance in explaining the principle of processing of visible-nonvisible position determination on an object.

The first condition (i.e., visible or non-visible) can be determined in accordance with the method shown in FIG. 3. When a sight line unit vector E* pointing to the observing point 3 is drawn at a point P21 on an object 7 (i.e., a sphere) having an enclosed curved surface 7A in order to obtain an inner product of this sight line unit vector E* and the normal unit vector N*, the necessary and sufficient condition that the surface portion at point P21 is visible can be expressed as $$N^* \cdot E^* > 0 \qquad (3)$$

Here, if the angle subtended by the sight line unit vector E* and the normal unit vector N* is $\phi$, the inner product of E* and N* is $$N^* \cdot E^* = |N^*| \cdot |E^*| \cos \phi = \cos \phi \qquad (4)$$

Therefore, the condition which satisfies the formula (3) can be established if $\phi$ is an acute angle as $$0 < \phi < \frac{\pi}{2} \qquad (5)$$

For instance, as shown in FIG. 3, if the angle $\phi$ is acute at the point P21 of intersection of the sight line EL3 and the surface 7, since the inner product of the sight line unit vector E* and the normal unit vector N* is positive, the condition of formula (3) is satisfied, so that the surface portion at point P21 is determined to be visible. In contrast with this, in FIG. 3, if the angle $\phi$ subtended by the sight line EL3 and the rear surface portion 7 at a point P22 is more than $\pi/2$, since the inner product of the sight line unit vector E* and the normal unit vector N* is negative, the condition of the formula (3) is not satisfied, so that the surface portion at point P22 is determined to be non-visible.

The above determination is to judge whether the gradient of the surface portion at each point lying on the curved surface 7A faces to the observing point 3 or not. Such points are referred to as visible candidate points. The visible candidate points are finally determined to be visible points only when the above second condition is satisfied. That is, as explained with reference to FIG. 2, a visible candidate point P11 or P15 having the nearest distance to the observing point 3 is selected from a plurality of visible candidate points (P11, P12, P13) or (P14, P15) lying on the line of sight EL1 or EL2, and the selected point is determined to be a final visible point, respectively.

Transformation Processing Procedure (Various table forming procedures)

Figure 4:
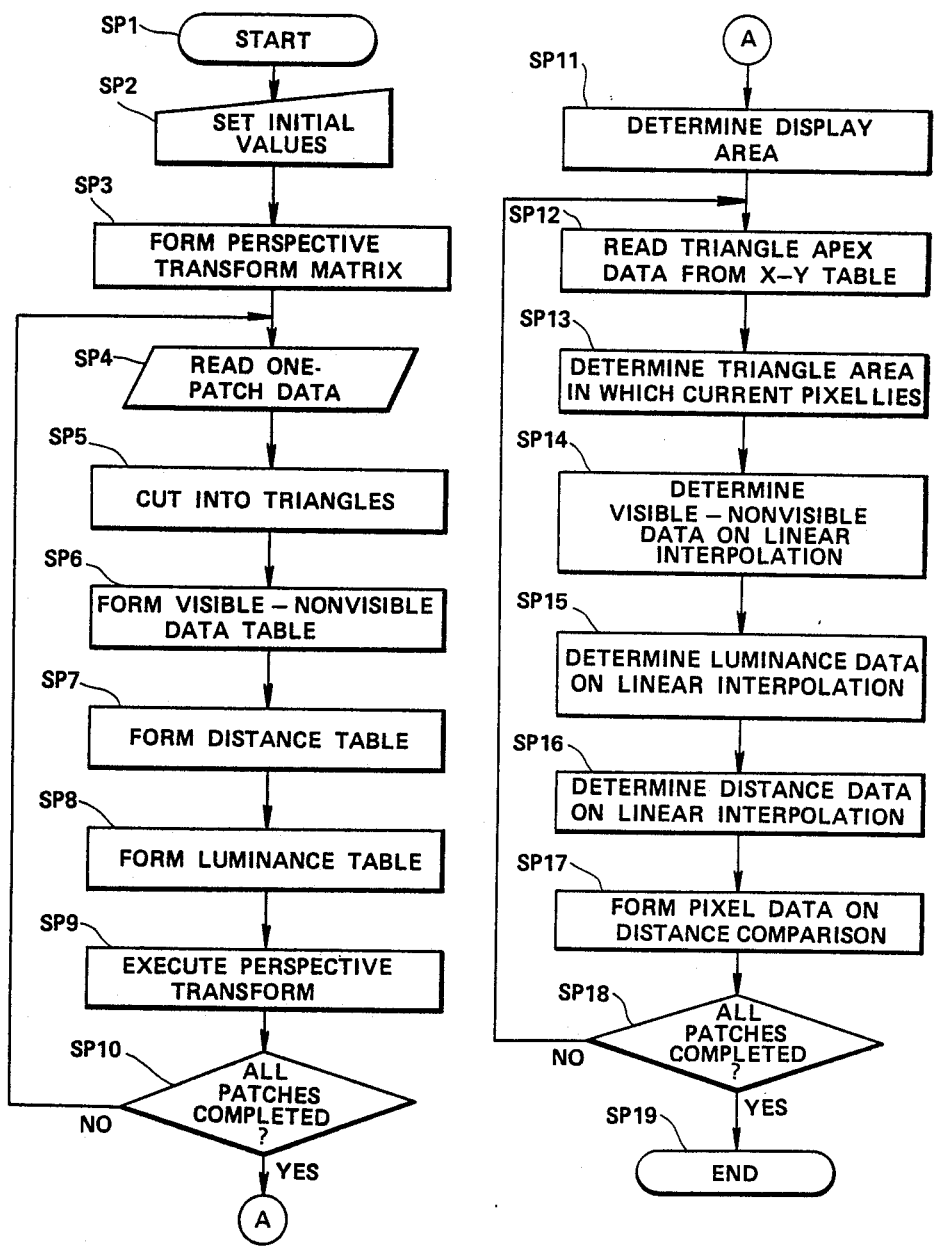
FIG. 4 is a flowchart showing the procedure of image displaying processing according to the present invention.

An image display system which adopts a computer graphic method executes the graphic image transformation processing of the present invention by means of a central processing unit (CPU) (not shown) and in accordance with the processing procedure shown in FIG. 4.

In step SP1, the transformation processing control program starts. In step SP2, the data describing the position of observing point 3 (FIG. 4) and light source (FIG. 1) and the number of patches necessary for transformation processing a graphic image are inputted by an operator to the CPU.

On the basis of three-dimensional graphic image data previously stored in the digital memory of the CPU, the CPU forms a perspective transformation matrix used for transforming points on curved surfaces of a three-dimensional graphic image onto the corresponding points on a view plane 5 in step SP3. That is, the above matrix is necessary when a three-dimensional graphic image represented by the graphic image data is perspectively displayed on the view plane 5 (FIG. 2) determined on the basis of the observing point 3 preset at step SP2.

Thereafter, as shown in FIG. 6, the CPU reads data DATA for one patch of graphic image data to be transformed and displayed in step SP4, and divides the DATA, as if the patch were cut into triangular shapes, in step SP5.

In the case of this embodiment, the dividing of the data into triangles is as folllows: the data DATA for one patch are read by the CPU from its memory in sequence, and the intersections of two groups of computed cutting lines L1 and L2 are calculated in sequence on the basis of predetermined parameters. The two groups of the cutting lines are arranged at regular intervals, although not necessarily spaced at regular intervals on the curved surface. Here, the number of lines of the cutting line group L1 and L2 is selected as five in the horizontal and vertical directions in such a way that the two cutting line groups L1 and L2 intersect each other in a net-like arrangement. Therefore, a curved surface composed of one-patch data DATA is divided into small areas UA surrounded by two pairs of adjacent lines of the cutting line groups L1 and L2 and each small area UA is cut off for processing so as to be surrounded by four intersection points PX.

The size of this small area UA is determined in association with the number of patches inputted at step SP2. When the small area UA is transformed on a display raster screen, the number of pixels included within the transformed small area can be automatically determined.

The small areas UA are each further divided into two triangular unit areas UA1 and UA2 respectively by diagonal lines L3 connecting two points of intersection PX diagonally opposite to each other, so that a curved surface represented by data DATA is divided into a number of triangular unit areas UA1 and UA2. The number of pixels included in each triangular unit area UA1 or UA2 is 20 to 30, for instance.

After the cutting of a curved surface into triangular unit areas UA1 and UA2 has been executed, the CPU calculates a normal unit vector N* at three intersection points, that is, at the apexes of each triangular unit area UA1 or UA2.

The fact that three data at three apexes are obtained by dividing the curved surface data DATA to be processed into two triangular unit areas UA1 and UA2 indicates that when the triangular unit areas UA1 and UA2 are transformed on a display raster screen, the data for 20 to 30 pixels included within each transformed triangular unit area can be represented by only the three apex data; that is, the succeeding processings can be executed on the basis of the three apex data, thus the data processing speed is markedly increased as will be illustrated hereinafter.

In the succeeding step SP6, the CPU computes a table in memory, including visible and nonvisible data used for hidden surface processing. In this step, the CPU calculates sight line unit vectors E* at the three apexes of the triangular unit areas UA1 and UA2, respectively, as shown in FIG. 7; calculates each inner product of the sight line unit vector E* and the normal unit vector N*; and sequentially stores these calculated results in the visible-nonvisible table TABLE 4 of a table 10 provided within the memory of the computer, as shown in FIG. 5.

In the table 10, the curved surface data DATA (FIG. 6) for one patch are stored as data of 25 words per patch being divided into five intersections, respectively in the direction that the cutting line group L2 is arranged (referred to as U direction) and the direction that the cutting line group L1 is arranged (referred to as V direction).

Therefore, in the visible-nonvisible table TABLE 4, the visible-nonvisible data for 25 intersections PX are stored for each patch in order to form the first condition data necessary for hidden surface processing as described with reference to FIG. 2.

Figure 8:
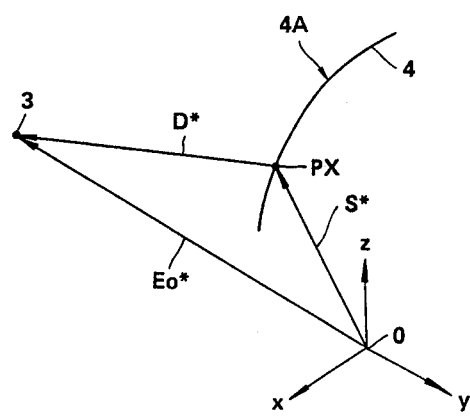
FIG. 8 is a diagram for assistance in explaining the method of forming distance data.

Subsequently, in step SP7, the CPU forms a distance table. The distance table is formed by the CPU by calculating a distance vector D* from the apex PX to the observing point 3 at each apex of the curved surface data DATA as shown in FIG. 8 and by storing the calculated results in a distance table TABLE 3 of the table 10.

The distance data D in this distance table TABLE 3 are used for determining the second condition (FIG. 2) in hidden surface processing. The distance vector from the apex PX to the observing point 3 can be calculated as $$D^* = E_o^* - S^* \tag{6}$$

The distance data D is obtained by calculating the absolute value of the distance vector D*.

Therefore, when distance data for plural curved surfaces are obtained at the same pixel on the display raster screen, it is possible for the CPU to calculate the data of the curved surface portion nearest to the observing point 3 to be the distance data and to exclude distance data for the same pixel which is further away, i.e., for a surface point which is hidden to the observing point 3.

Figure 9:
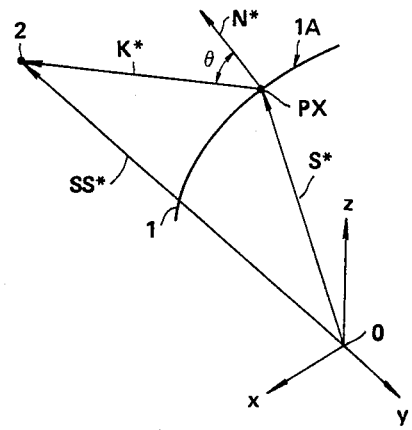
FIG. 9 is a diagram for assistance in explaining the method of forming luminance data; which also corresponds to FIG. 1.

Subsequently, in step SP8, the CPU calculates a luminance table for storage in memory. As shown in FIG. 9 corresponding to FIG. 1, the luminance at each apex is calculated as follows: The positional vector K* from the apex PX to the light source 2 is calculated. Then, the cosine of the incident angle $\theta$ is calculated on the basis of the inner product of the calculated result K* and the normal unit vector N* at apex PX as $$\cos\theta = \frac{K^* \cdot N^*}{|K^*| \cdot |N^*|} = A \tag{8}$$

The calculated result is represented by a variable A.

The luminance I can be calculated by the use of the variable A as follows:

$$I = (1-D) \cdot A + D \tag{9}$$

Here, although the value of constant D is about 0.22, for instance, since the variable A varies within a range 0 to 1 ($\theta$ changes within $\pm\pi/20$), the luminance I primarily changes according to the change in the light allowed to be incident from the light source 2 upon the apex PX. These data are stored in the luminance table TABLE 2 of the table 10 (FIG. 5) and used for the shadow processing as described with reference to FIG. 1.

Figure 10:
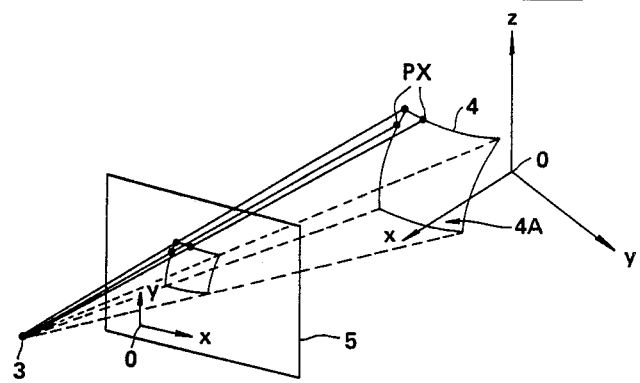
FIG. 10 is a diagram for assistance in explaining the procedure of perspectively transforming a curved surface of an object onto a display screen.

Subsequently, the CPU proceeds to step SP9 for executing the perspective transformation processing. As shown in FIG. 10 corresponding to FIG. 2, the perspective transformation processing is to transform the apexes PX on the curved surface 4A within a three-dimensional space onto a two-dimensional X-Y plane of a view plane 5, which represents the raster scan display screen, when the positions of the apexes PX on the curved surface 4A of an object 4 are perspectively seen on the view plane 5 disposed between the object 4 and the observing point 3. The transformation processing can be executed by transform-calculating the positional data at apexes PX obtained in the above step SP5 onto the X-Y plane on the basis of the perspective transformation matrix formed in the step SP3. The calculated results are stored in the XY table TABLE 1 of the table 10.

As described above, using the patch data in table 10, it is possible for the CPU to form image data representative of an object's surface at each apex position of the triangular areas of each patch into which the CPU has computationally divided the object's surface. In the succeeding step SP10, the CPU determines whether the processing has been completed for the data for all the patches set as initial values in step SP2. If not completed, the CPU returns to the step SP4 to compute the succeeding patch data in the table 10. If YES is obtained in the step SP10, the CPU can store in its memory all the information representative of the curved surface states to be displayed on the display screen in the table 10 in relation to three apex positional data of the triangular unit areas UA1 and UA2 (FIG. 6), respectively.

When the above transformation processing has been executed, it is possible to handle the data at apexes on a curved surface lying within a three-dimensional space as the data on the X-Y plane. Therefore, the following processings can be executed with the X-Y plane, that is, the display raster screen as the reference plane.

LINEAR INTERPOLATION, SHADOW AND HIDDEN SURFACE PROCESSINGS

For the curved surface information stored in the table 10 as described above, since each triangular unit area UA1 or UA2 corresponds to 20 to 30 pixels on the display screen, in the succeeding steps SP11 to SP18, linear interpolation calculation is executed for each pixel by the use of the data in table 10 in order to obtain image data for the shadow processing and the hidden surface processing. On the basis of these image data, it is possible to solidly reproduce a plane image on the display screen.

That is to say, in the step SP11, the CPU executes the processing for determining a display area. This processing step is to determine a display area so that an image can be displayed at roughly the central position of a display screen in an appropriate dimension. As shown in FIG. 11, all the data are read from memory from the XY table TABLE I (FIG. 5) of the table 10 in order to extract the maximum value Xmax and the minimum value Xmin in the X-axis direction and the maximum value Ymax and the minimum value Ymin in the Y-axis direction of the perspectively-transformed apex positional data which configure a two-dimensional display image DES. Thereafter, the middle position Xc between the maximum value Xmax and the minimum value Xmin in the X direction is obtained by the following formula:

$$Xc = \frac{Xmax + Xmin}{2} \quad (10)$$

The middle position Yc between the maximum value Ymax and the minimum value Ymin in the Y direction is determined by the following formula:

$$Yc = \frac{Ymax + Ymin}{2} \quad (11)$$

Therefore, the central position (Xc, Yc) can be obtained and is set to a central position on the display raster screen 11. Simultaneously, the display area ARE is determined so that the displayed image DES can be accomplished within the capacity of a frame buffer memory having memory cells corresponding to pixels which configure the display screen 11.

Here, the display area has an area extending from the maximum value Xmax to the minimum value Xmin in the X direction and from the maximum value Ymax to the minimum value Ymin in the Y direction as depicted in FIG. 11.

Once the display area ARE is determined, the CPU executes all succeeding processing steps only for pixels lying within the display area ARE. This feature markedly reduces the amount of transformation calculation for an image to be displayed on the raster screen. In more detail, in the case where a transformation-processed image is displayed on a raster screen, there has conventionally been adopted the method of calculating the presence or absence and the values of image data for all the pixels which configure the raster screen and then storing the calculated results in the corresponding memory areas of the frame buffer memory. But by employing the method illustrated in FIG. 11, since no calculation processing is made for pixels having no data to be displayed, it is possible to considerably reduce the amount of image transformation calculations as a whole.

In the step SP12, the CPU reads the positional data DATAX (FIG. 12) for one patch, corresponding to the apexes of the triangular unit areas UA1 and UA2 in this display area ARE, in sequence from the XY table TABLE 1 of the table 10 in order to execute interpolation calculation processing. That is, the CPU supplies data necessary for interpolation calculations in order to determine the luminance of pixels included within the triangular areas UA1X and UA2X lying within the display area ARE on the display screen (FIGS. 11 and 12).

In the step SP13, the CPU then determines whether the current pixel (referred to as a processed point) Pc belongs to the triangular area UA1X or UA2X, that is whether the processed point Pc (Xc, Yx) lies within the triangular area UAX or not. The procedure for accomplishing this uses the center of gravity Po (Xo, Yo) of the triangular area UAX surrounded by three straight lines DL1, DL2 and DL3 connecting between the apexes P1 (X1, Y1), P2 (X2, Y2) and P3 (X3, Y3) mutually on the X-Y plane obtained by the perspectively-transformed three apexes of each triangular area UA1X or UA2X which were calculated in step SP9 (FIGS. 4 and 10), stored in TABLE 1, as depicted in FIG. 13.

The equation of the straight line DL1 passing through the apexes P1 and P2 can be expressed as $$Y - Y1 = \frac{Y2 - Y1}{X2 - X1}(X - X1) \quad (12)$$

If rewritten, $$(Y-Y1)(X2-X1)-(Y2-Y1)(X-X1)=0 \quad (13)$$

However, the above equation (13) indicates that the left side thereof is zero when the X-coordinate value and the Y-coordinate value of points lying on the straight line DL1 are substituted for the X and Y.

Therefore, the left side of the equation (13) is replaced with F(X,Y) as $$F(X,Y)=(Y-Y1)(X2-X1)-(Y2-Y1)(X-X1) \quad (14)$$

If points on the straight line DL1 are substituted, F(X,Y) is zero. However, if coordinate values of points inside or outside the straight line DL1 are substituted, F(X,Y) is a positive or negative value.

Paying attention to this point, when the coordinate values of the center of gravity Po of the triangular area UAX expressed as $$Xo = \frac{X1 + X2 + X3}{3} \quad (15)$$

$$Yo = \frac{Y1 + Y2 + Y3}{3} \quad (16)$$

are substituted into the equation (14), the following first equation can be obtained:

$$F(Xo,Yo)=(Yo-Y1)(X2-X1)-(Y2-Y1)(Xo-X1) \quad (17)$$

On the other hand, when the coordinate values of processed point Pc(Xc,Yc) are substituted into the equation (14), the following second equation can be obtained:

$$F(Xc,Yc)=(Yc-Y1)(X2-X1)-(Y2-Y1)(Xc-X1) \quad (18)$$

Therefore, if the product of both is positive as $$F(Xo,Yo) \cdot F(Xc,Yc) > 0 \quad (19)$$

it is possible to determine that the processed point Pc(Xc,Yc) lies on the side of gravity center Po(Xo,Yo) away from the straight line DL1. In this case, since the center of gravity Po lies of course within the triangular area UAX, it is possible to determine that the processed point Pc(Xc,Yc) which satisfies the condition of equation (19) lies inside the straight line DL1.

Similar calculations are made with respect to the straight lines DL2 and DL3 which form the other sides of the triangular area UAX as follows:

$$F(Xc,Yc)=(Yc-Y2)(X3-X2)-(Y3-Y2)(Xc-X2) \quad (20)$$

$$F(Xc,Yc)=(Yc-Y3)(X1-X3)-(Y1-Y3)(Xc-X3) \qquad (21)$$

As described with respect to equation (19), if the product of F(Xo,Yo) and F(Xc,Yc) calculated by the CPU is determined to be positive on the basis of the calculated results, the processed point Pc(Xc,Yc) lies on the side of gravity center Po(Xo,Yo) away from all the straight lines DL1, DL2 and DL3 constituting three sides of the triangular area UAX. Since it is evident that the center of gravity of a triangle lies inside the three sides thereof, it is therefore possible to determine that the processed point Pc(Xc,Yc) lies within the triangular area UAX.

In contrast with this, if a negative result is obtained as to any one of values of equations (18), (20) and (21) as follows:

$$F(Xo,Yo) \cdot F(Xc,Yc) < 0 \qquad (22)$$

then the processed point Pc(Xc,Yc) must lie on the side opposite to the gravity center Po(Xo,Yo) away from one or more straight lines DL1, DL2 and DL3, thus the processed point Pc is thereby determined by the CPU to not lie within the triangular area UAX.

Where the processed point Pc is determined to lie outside the triangular area UAX as described above, the CPU does not execute the succeeding interpolation calculations for that point, i.e., that pixel, in processing the points for that triangular area. The same determination will be repeated for new triangular areas UAX until a triangular area UAX including a processed point Pc inside is found out.

Figure 14A:
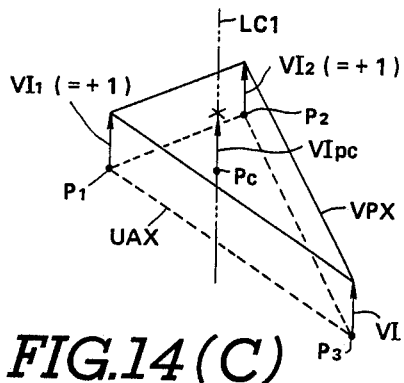
FIGS. 14(A), 14(B), and 14(C) are diagrams for explaining the procedure of linear interpolation for visible-nonvisible data.
Figure 14B:
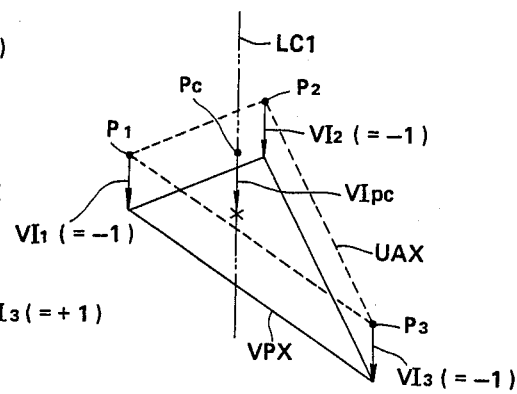

As a result, in the step SP13 when a triangular area UAX within which a processed point Pc lies is found, the CPU proceeds to the succeeding step SP14 to execute the processing of visible-nonvisible determination on the basis of linear interpolation. That is, the CPU reads in sequence the visible-nonvisible data stored for each triangular apex P1, P2, P3 from the visible-nonvisible table TABLE 4 (FIG. 5) of the table 10 in order to computationally, vertically set the corresponding visible-nonvisible data vectors $VI_1$, $VI_2$, $VI_3$ at the positions P1, P2, P3 on the display screen as depicted in FIG. 14 and to compute a visible-nonvisible plane VPX intersecting all of the tops of the set of visible-nonvisible data vectors $VI_1$, $VI_2$, $VI_3$. This visible-nonvisible plane VPX changes in dependence upon the values of the visible-nonvisible data $VI_1$, $VI_2$, $VI_3$ set at the apexes P1, P2, P3 as follows: If all the visible-nonvisible data $VI_1$ to $VI_3$ are "+1" in value, it is possible to obtain a visible-nonvisible plane VPX extending in parallel to and above the triangular area UAX as depicted in FIG. 14(A). In contrast with this, if all the visible-nonvisible data $VI_1$ to $VI_3$ are "−1" in value, it is possible to obtain a visible-nonvisible plane VPX extending in parallel to and below the triangular area UAX as depicted in FIG. 14(B).

Figure 14C:
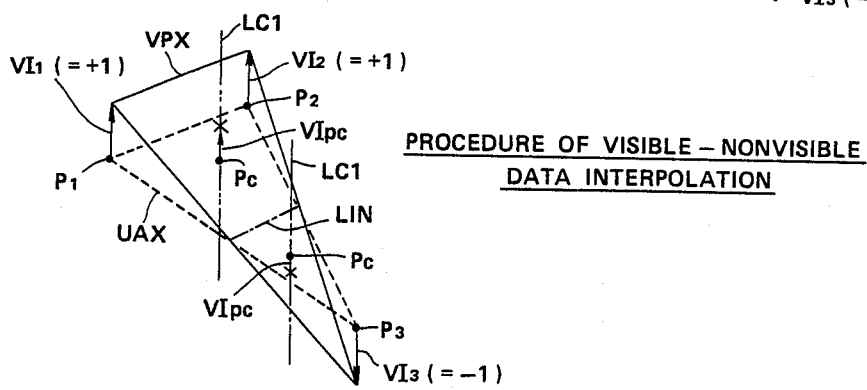

Further, if any one or two parts (e.g. $VI_1$ and $VI_2$) of the visible-nonvisible data $VI_1$ to $VI_3$ are "+1" and the remaining part (e.g. $VI_3$) is "−1", the visible-nonvisible plane VPX intersects the triangular area UAX, as depicted in FIG. 14(C), in such a way that the visible-nonvisible plane VPX existing on the sides of apexes P1 and P2 away from the intersectional line LIN is positive and the plane VPX existing on the side of apex P3 away from the line LIN is negative.

Therefore, the point $VI_{pc}$ of the intersection of the straight line LC1 passing through the processed point Pc and perpendicular to the triangular area UAX (e.g. the display raster screen) and the visible-nonvisible plane VPX is determined and the value $VI_{pc}$ is interpolated as the visible-nonvisible data at the processed point Pc. For example, the values of $VI_{pc}$ in FIGS. 14(A) and 14(C) are positive and thus the data at the points Pc are classified as visible data. On the other hand, the values of $VI_{pc}$ in FIG. 14(B) and $VI_{pc}'$ in FIG. 14(C) are negative, indicating nonvisible data is at the points Pc (FIG. 14(B)) and Pc' (FIG. 14(C)), respectively.

As described above, with only the three visible-nonvisible data $VI_1$, $VI_2$ and $VI_3$ at the three apexes P1, P2, P3 obtained from a three-dimensional curved surface to be displayed, it is possible to easily obtain the visible-nonvisible data at all the processed points Pc included within the triangular unit area UAX on the display screen (keeping in mind that these processed points represent pixels on the display screen). This is done by the CPU by calculating (linear interpolation calculation) the point of intersection between the straight line LC1 passing through the processed point Pc and the triangular visible-nonvisible plane VPX; a straightforward calculation which makes it possible for the CPU to obtain a definite solution without difficulty.

Figure 15:
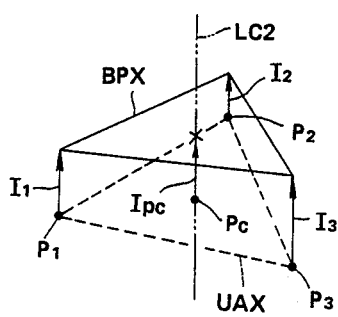
FIG. 15 is a diagram for explaining the procedure of linear interpolation for luminance data.

Subsequently, the CPU proceeds to the step SP15 to execute the luminance determination processing in accordance with linear interpolation. In this processing, as shown in FIG. 15, the luminance Ipc at the processed point Pc of a pixel included within the triangular area UAX is interpolation-calculated on the basis of the luminance data I1, I2, I3 at the apexes P1, P2, P3 of the triangular area UAX on the display screen following a procedure similar to that used for determining visible-nonvisible data.

The luminance data I1, I2, I3 at the apexes P1, P2, P3 of the triangular area UAX are read from the luminance table TABLE 2 of the table 10 and are computationally set vertically at the corresponding apexes P1, P2, P3 on the display screen. A luminance plane BPX is calculated which intersects each top end of the luminance data vectors I1, I2, I3. A straight line LC2 is set perpendicular to the display screen at the processed point Pc of each pixel included within the triangular area UAX. The point of intersection of the straight line LC2 and the luminance plane BPX is obtained. The value at the intersection on the luminance plane BPX is determined to be the luminance Ipc at the processed point Pc.

As described above, when all the pixels included within the triangular area UAX are selected in sequence as the processed points Pc, it is possible to readily obtain all the luminance data for all the pixels using the three luminance data obtained from the three-dimensional curved surface by sequentially executing the above linear interpolation calculation for each intersection between the straight lines LC2 and the triangular luminance plane BPX for each processed point Pc; a straightforward calculation which enables the CPU to obtain a definite solution without difficulty.

Figure 16:
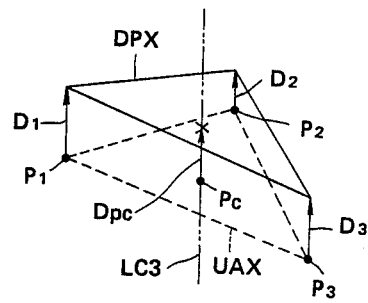
FIG. 16 is a diagram for explaining the procedure of linear interpolation for distance data.

Subsequently, in the step SP16, the CPU executes the distance determination processing in accordance with interpolation calculation. In this processing, as shown in FIG. 16, the distance from the observing point is interpolation-calculated by the CPU for each pixel included within the triangular area UAX on the display screen following a procedure similar to those just previously described. First, the distance data D1, D2, D3 at the apexes P1, P2, P3 on the display screen are read from the distance table TABLE 3 of the table 10 and are computationally set vertically at the apexes P1, P2, P3. A distance plane DPX is calculated by the CPU to intersect each top end of the distance data vectors D1, D2, D3. The intersection between the straight line LC3 passing through the processed point Pc and perpendicular to the display screen and the distance plane DPX is calculated by the CPU. The value at this intersection on the distace plane DPX is determined to be the distance Dpc at the processed point Pc from the observing point.

In this case, as in the above described processes for determining the luminance and visible-nonvisible data for the pixels, it is possible to obtain the distance data Dpc at the processed point Pc in accordance with the interpolation calculation by sequentially designating all the pixels included within the triangular area UAX as the processed point Pc. Again, since this interpolation calculation is to obtain a solution between the straight line LC3 and the distance plane DPX, it is possible for the CPU to obtain a definite solution without difficulty.

Thereafter, the CPU proceeds to the step SP17 to execute the processing of forming the pixel data on the basis of distance comparison.

In this processing, the luminance data Ipc (FIG. 15) and the visible-nonvisible data VIpc (FIG. 14) corresponding to a curved surface with the smallest distance data Dpc are collected for all the pixels included within the display area ARE (FIG. 11) on the display screen. The luminance data of the curved surface having the visible data and the smallest distance data Dpc are assembled in the CPU as pixel data to be displayed on the display screen.

In practice, the CPU includes a frame buffer memory having a plurality of memory cells, each corresponding to a display pixel, and a depth buffer memory corresponding to each pixel of the frame buffer memory. In the step SP16, when the distance data Dpc corresponding to each pixel is determined and the smallest distance data Dpc for the same pixel is obtained, the distance data are stored in the memory areas corresponding to the pixels of the depth buffer memory and simultaneously the luminance data Ipc determined in the step SP15 are stored in the frame buffer memory. Therefore, the luminance data Ipc obtained from the curved surace having the smallest distance data Dpc are to be written in the frame buffer memory.

The above-mentioned serial calculation processings from SP12 to SP17 are executed for each pixel included within one patch. Whenever the processing of step SP17 has been completed, the CPU determines whether the calculation processing has been completed for all the patches in the step SP17. If the result is NO, the CPU returns to the step SP12 again to repeat the calculation processing of data for new pixels. In contrast with this, if the result is YES in the step SP18, the CPU proceeds to the step SP19 to complete the program control.

Operation of Embodiment

In accordance with the data processing method shown in FIG. 4, a CPU is programmed to perspectively transform the curved surfaces of an object lying within a three-dimensional space when seen from a predetermined observing point on a two-dimensional display screen for displaying an image. The curved surfaces of the object within a three-dimensional space are computationally divided into a plurality of triangular unit areas UA1 and UA2 in order to obtain the object surface information data represented at three apexes PX. After the three apexes PX have been perspectively transformed onto a two-dimensional plane representing the display raster screen, a triangular data plane composed of object surface information data on the curved surface is formed at the apexes P1, P2, P3 transformed on the two-dimensional plane, so that it is possible to obtain image data for all the pixels included within the triangular area on the screen using linear interpolation calculations.

Using only the three apex data for each triangular unit area to perspectively transform the object surfaces within the three-dimensional space onto the two-dimensional plane markedly reduces the time required for the transformation calculation. Further, the image data for each pixel is obtained by calculating, using linear interpolation, a solution of the intersection between the data plane and a straight line passing through the point in the two dimensional plane which point corresponds to the pixel on the display screen. The solution can thus be calculated by the CPU simply and definitely.

More specifically, according to the image display method shown in FIG. 4, since the luminance data plane can be formed by the CPU on the basis of the triangular unit area UAX on the two-dimensional plane, it is possible to easily provide shadow according to the position of a light source on the image displayed on the screen so as to stably reproduce the ups and downs on the curved surfaces of an object.

Further, according to the image display method shown in FIG. 4, since it is possible for the CPU to clearly determine the boundary between visible area and nonvisible area on the basis of the results of the linear interpolation calculation for each pixel by providing the visible-nonvisible data plane on the two-dimensional plane, even in the case where the visible area and the nonvisible area are both present within the triangular area UAX on the two-dimensional plane, the CPU can readily execute the hidden surface processing.

For hidden surface processing, when a plurality of visible data are obtained for the same pixel, since the image data of the curved surface having the shortest distance is determined by the CPU to be effective and is displayed by the use of the distance data representative of the distance from the observing point to the unit area UA1 or UA2 on the curved surface, the CPU can securely execute the hidden surface processing without confusion and thus produce an image having a clear feeling of distance on the display screen.

In the image displaying method as shown in FIG. 4, when the interpolation calculation is made with respect to the triangular area UAX obtained by perspectively transforming an image onto the two-dimensional plane, a triangular area UAX to which the processed point Pc (corresponding to the currently processed pixel) belongs is determined by the CPU by simply calculating whether the processed point Pc lies on the side of the gravity center Po using the three straight lines DL1, DL2, DL3 to define the three sides of the triangular area UAX and calculating the gravity center Po of the triangular area UAX, as explained in greater detail above. This allows a marked reduction in calculation processing time compared to prior art methods which simply processed the data for all pixels.

Finally, in executing the above image transformation processing, the positional data of an object lying within a three-dimensional space and seen from a specified observing point are perspectively transformed onto a two-dimensional plane; a display area ARE (FIG. 11) in which the transformed positional data lie is determined; and the above described series of image display processing calculation (that is, determination of a triangular area within which the processed point lies, determination of visible-nonvisible area, determination of the distance from the observing point, determination of the visible surfaces) are executed only for this display area ARE. This also greatly reduces the time required for the calculations compared to prior art methods.

Modification

In the above embodiment, the data with respect to an object lying within a three-dimensional space have been explained only for the case of data representative of the surfaces of an object surrounded by curved surfaces. However, without being limited to this, it is possible to similarly apply the present invention to data representative of surfaces of an object surrounded by flat surfaces.

Further, in the above embodiment, when the display area representative of a range within which an object is to be displayed on the display screen is determined (FIG. 11), the maximum and the minimum values are determined in both the X and Y directions. However, it is also possible to determine the display area on the basis of any given straight lines or curves.

Effect of the Invention

As described above, in the present invention, since the curved surface of an object lying within a three-dimensional space is divided by the CPU into triangular unit areas UA1 and UA2 for computational purposes and the image information of the unit area UA1 or UA2 is represented by three apexes PX of each unit area UA1 or UA2, it is possible to execute the image transformation processing in accordance with simple calculations and to markedly reduce the image transformation processing time.

Further, in the present invention, when the image information to be displayed on the display screen is obtained, the CPU first determines the display area representative of an area within which an object is to be substantially displayed and then executes the data transformation and display processing for only the pixels included within the determined display area. Thus no data transformation and display processing is executed by the CPU for pixels included in other areas within which an object is not displayed, thereby making it possible to reduce the calculation time as a whole.

Also, since a triangular unit area within which each pixel to be processed is determined by the CPU using the center of gravity and the three sides of the traingular unit area, the interpolation calculation processing is further simplified.

Lastly, since visible-nonvisible data are determined by the CPU using an inner product of the normal unit vector and the sight line unit vector at each apex of each triangular unit area and the visible or nonvisible point is determined by checking the signs of the inner product, the CPU can execute shadow processing in a simple manner. In addition, when plural visible data are obtained at the same pixel, only the luminance data having the smallest distance data are caused by the CPU to be displayed. This allows the CPU to execute hidden surface processing securely.

It will be understood by those skilled in the art that the foregoing description is in terms of a preferred embodiment of the present invention wherein various changes and modifications may be made without departing from the spirit and scope of the invention, as set forth in the appended claims.

What is claimed is:

1. A method of processing, by means of a programmed computer, electronic, image data signals representative of surfaces of an object lying within a three-dimensional space for display at corresponding pixels of a two-dimensional, electronic display screen in accordance with a perspective transformation method when seen from a predetermined observing point, which comprises the following steps of:
  (a) dividing a surface of the object into a plurality of triangular unit areas and obtaining first plural data representative of surface image information for the object at the three apexes of each triangular unit area;
  (b) perspectively transforming only positional data representative of positions of the three apexes of each triangular unit area, which positional data are among the first plural data, onto a two-dimensional plane corresponding to the display screen in relation to the predetermined observing point to obtain second positional data representative of positions of second sets of three apexes, corresponding, respectively, to the three apexes of each triangular unit area on the two-dimensional plane;
  (c) vertically setting other object surface image information data included in the first data separately at the three apexes of each triangular unit area on the two-dimensional plane to separately form plural triangular image data planes at the tops of each three vertically set object surface image information data;
  (d) obtaining by interpolation calculation each point of intersection between each formed triangular image data plane and each straight line vertically set at a different point included within each triangular area surrounded by the three apexes on the two-dimensional plane, which points, referred to hereinafter as processed points, correspond to different and corresponding individual pixels of the display screen, to separately obtain surface image information data for the object; and
  (e) separately displaying said surface image information data at each such corresponding pixel on the display screen.

2. The method as set forth in claim 1, which further comprises the steps, to be executed between steps (b) and (c), of determining a display area within which an object image is to be displayed on the two-dimensional plane by selecting the maximum and minimum values of the second positional data representative of positions of the three apexes on the two-dimensional plane and calculating a center of the displayed object image, and therefore completing the remaining steps (c) through (e) only for pixels included within the determined display area.

3. The method as set forth in claim 1, which further comprises the following steps, to be executed between steps (b) and (c), of:
  (a) calculating each center of gravity of each triangular unit area on the two-dimensional plane; and
  (b) determining a triangular unit area within which the current processed point lies on the basis of each calculated center of gravity and the three sides of the triangular unit area before vertically setting object surface image information data included in the first data at the three apexes of the triangular unit area on the two-dimensional plane.

4. The method as set forth in claim 1, wherein in step (c) one of the object surface image information data is luminance data obtained at the three apexes of each triangular unit area fo providing shadow on the displayed object image and further comprising the step of calculating the luminance data as the product of each normal unit vector N* and each light source vector K* at each apex of each triangular unit area, divided by the product of their absolute values.

5. The method as set forth in claim 4, wherein one of the object surface image information data is visible-nonvisible data at the three apexes of each triangular unit area for representing hidden surfaces on the displayed object image, the visible-nonvisible data being calculated as the inner product of each normal unit vector N* and each sight line unit vector E* at each apex of each triangular unit area, the visible and nonvisible points being determined as a function of the positive or negative signs of the calculated inner product, respectively, and displaying the luminance data when each processed point is determined to be visible but not displaying the luminance data when the processed point is determined to be nonvisible.

6. The method as set forth in claims 4 or 5, wherein one of the object surface image information data is distance data at the three apexes of each triangular unit area for providing hidden surface on the displayed object image, the distance data being calculated on the basis of calculating a sight-line vector $E_o^*$ and each apex position vector S*, and, when plural visible data exist at the same processed point of pixel, displaying only the luminance data having the smallest distance data and not displaying the remaining luminance data so as to represent a hidden surface.

7. A method of computing data for displaying an image of an object lying within a three-dimensional space on a two-dimensional display plane by means of a programmed computer having a memory unit in which three-dimensional graphic image information data are previously stored, which comprises the following steps of:

(a) entering into the computer data representing a position of an observing point, a position of a light source, and the number of patches into which the curved surfaces of the object are to be divided, and then, using the programmed computer, automatically;

(b) forming a perspective transformation matrix for perspectively transforming onto a view plane determined on the basis of the observing point, positional data representing the curved surface of the object, which positional data had been previously-stored in the computer memory as part of other three-dimensional graphic image information data;

(c) reading from memory the graphic image information data corresponding to one patch of the object surface to be transformed;

(d) dividing the read positional data DATA into a plurality of triangular unit areas UA1, UA2 to determine the number of processing points (hereinafter "pixel points") each representing a seperate display plane pixel included within each triangular unit area and to obtain apex positional data at each triangular apex PX;

(e) calculating each normal unit vector N* at each triangular apex PX of each unit area UA1, UA2;

(f) forming a visible-nonvisible data table in memory by calculating an inner product of the normal unit vector N* and a sight-line unit vector E* from each triangular apex PX to the observing point and by storing the calculated results VI, $VI_2$, $VI_3$ corresponding to each apex PX within the computer memory for background shadow processing;

(g) forming a distance table in memory by calculating a distance vector D* from each triangular apex PX to the observing point using a sight-line vector $E_o^*$ and a triangular apex positional vector S* and by storing the calculated results $D_1$, $D_2$, $D_3$ corresponding to each apex PX within the computer memory for hidden surface processing;

(h) forming a luminance table in memory by calculating a luminance value I at each triangular apex PX as the product of a light source positional vector K* and the normal unit vector N*, at each apex PX, divided by the product of their absolute values, and by storing the calculated results $I_1$, $I_2$, $I_3$ corresponding to each apex PX within the computer memory;

(i) perspectively transforming each triangular apex positional data DATA for the curved surface of the object obtained in step (d) above onto the two-dimensional x-y plane in accordance with the previously formed perspective transformation matrix, the calculated results being stored within the computer memory as transformed positional data DATAX, P(X, Y); and (j) repeating the above steps from (c) to (i) for all patches.

8. A display data computing method as recited in claim 7 comprising the further steps of:

(k) determining a display area DES on the two-dimensional plane by obtaining a center ($x_c$, $y_c$) on the basis of the maximum and minimum values $x_{max}$, $x_{min}$, $y_{max}$, $y_{min}$ of the transformed positional data DATAX, P(X, Y) using an averaging calculation;

(1) sequentially reading the triangular apex PX positional data DATAX, P(X, Y) for each patch and (m) determining a triangular unit area UA1X, UA2X within which the current pixel, point lies by calculating a center of gravity and three sides of the cut triangle UA1, UA2;

(n) reading the stored visible-nonvisible data $VI_1$, $VI_2$, $VI_3$ corresponding to the separate apexes PX and, using linear interpolation calculation, determining each visible-nonvisible value VIpc at each pixel point;

(o) reading the stored luminance data $I_1$, $I_2$, $I_3$ corresponding to the separate apexes PX and, using linear interpolation calculation, determining each luminance value Ipc at each pixel point;

(p) reading the stored distance $D_1$, $D_2$, $D_3$ corresponding to the separate apexes PX and determining by linear interpolation calculation, each distance value Dpc at each pixel point;

(q) forming pixel data by collecting luminance data Ipc and visible-nonvisible data VIpc for each pixel point having the minimum distance data Dpc and by selecting luminance data Ipc at each pixel point at which the visible data is obtained; and (r) repeating the above steps (1) to (q) above for all the patches.

9. The display method as recited in claim 8 including the further steps of sequentially reading out said pixel data and forming on an electronic display screen a two dimensional display of and three dimensional object.

* * * * *